United States Patent [19]

Mitchell, Jr.

[11] 4,396,055

[45] Aug. 2, 1983

[54] ELECTROHYDRODYNAMIC INDUCTIVELY PUMPED HEAT PIPE

[75] Inventor: Archer S. Mitchell, Jr., Silver Spring, Md.

[73] Assignee: The United States of America as represented by the Secretary of the Navy, Washington, D.C.

[21] Appl. No.: 226,319

[22] Filed: Jan. 19, 1981

[51] Int. Cl.³ ............................................. F28D 15/00
[52] U.S. Cl. .................................. 165/1; 165/104.23; 417/50
[58] Field of Search ...................... 165/104.23, 104.28; 417/50

[56] References Cited

FOREIGN PATENT DOCUMENTS 641262  1/1979  U.S.S.R. ........................ 165/104.23
742695  6/1980  U.S.S.R. ........................ 165/104.23

OTHER PUBLICATIONS

Primary Examiner—Albert W. Davis, Jr.
Attorney, Agent, or Firm—Robert F. Beers; Arthur A. McGill; Prithvi C. Lall

[57] ABSTRACT

An applied traveling potential wave induces a traveling wave of electrical charge in the liquid phase of a dielectric working fluid providing an electrical traction which pumps the working fluid from a condensing section to an evaporating section of an electrohydrodynamic inductively pumped heat pipe. In one embodiment, a surface electrical traction is induced along an open interface that extends along the liquid phase return flow circuit, and in another embodiment, the electrical traction is induced in the liquid bulk of an inhomogeneous dielectric working fluid along the liquid phase return flow circuit.

11 Claims, 10 Drawing Figures

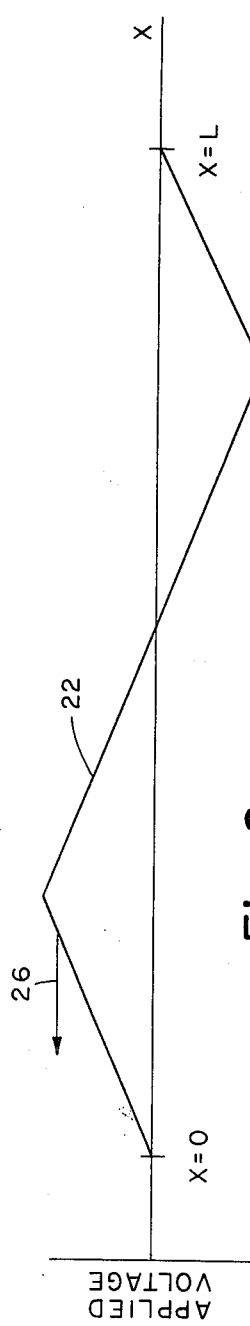
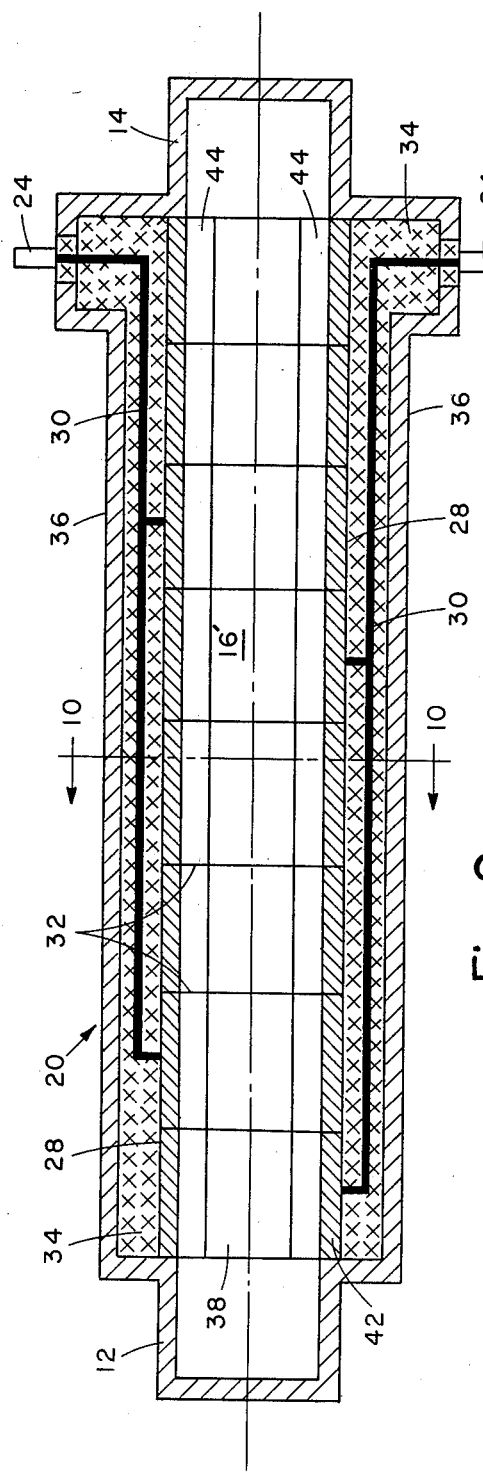
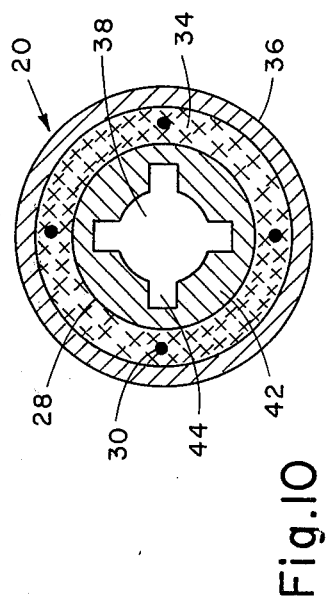
Fig. 8
Fig. 9
Fig. 10

ELECTROHYDRODYNAMIC INDUCTIVELY PUMPED HEAT PIPE

BACKGROUND OF THE INVENTION

This invention is drawn to the field of heat exchangers and more particularly to an electrohydrodynamic (EHD) inductively pumped heat pipe.

A conventional heat pipe is a two phase self-contained heat exchanger that transfers heat energy from a boiling section to a condensing section by means of supplying heat energy to a working fluid which, in evaporating and expanding into gas phase at the evaporator, carries in the form of the latent heat of vaporization the supplied heat to the condensor. Heat is removed by the condensor in the condensation of the gas back into liquid phase. A wick or matrix of capillary webbing establishes a capillary pumping head which returns the liquid condensate from the condensing section to the evaporating section by means of surface tension, and the cycle is repeated. This process continues indefinitely in the absence of other forces and results in a heat transfer rate substantially greater than the heat transfer rate of homogeneous metallic conductors.

The heat transfer rate of heat pipes is limited to a maximum thermal throughput often set by an upper limit on the capacity of the capillary head to pump the liquid condensate from the condensor to the evaporator. This upper limit is especially restrictive in medium and low temperature applications, where the use of dielectric working fluids having low surface tension and low thermal conductivity provide a comparatively weak capillary pumping head. In such situations, the evaporator may burn out due to a failure of the capillary pumping head to provide a sufficient quantity of working fluid to the evaporator.

Specially designed composite wicks having capillary driven low resistance longitudinal arteries and electrohydrodynamic flow structures have been used in an effort to augment the comparatively low maximum thermal throughput of low and medium temperature heat pipes. The principal difficulty with the composite wicks has been a considerable loss in performance due to entrapped gas occlusions which form in the artieries as a result of, among other factors, unsuccessful priming. The occlusions impede the return flow of the liquid condensate and lead to evaporator burnout.

Known electrohydrodynamic (EHD) heat pipes utilize the electrostatic pressure exerted on a dielectric working fluid by axial rod electrodes. The electrodes, raised to high voltage, form tent-like low resistance return flow channels which pump the working fluid from the condensing to the evaporating sections. The maximum electrostatic pressure that can be exerted by the axial electrode structure to pump the liquid condensate is limited, however, by the breakdown strength of the working fluid which restricts the maximum thermal throughput of this type of EHD heat pipe.

SUMMARY OF INVENTION

A self-priming voltage controllable electrohydrodynamic inductively pumped heat pipe according to the present invention greatly improves the maximum thermal throughput of heat pipes in low and medium temperature applications calling for the use of dielectric working fluids. An applied traveling potential wave induces a traveling wave of electrical charge in selected phase relation in the liquid phase of the dielectric working fluid providing an electrical traction which pumps the working fluid from the condensor to the evaporator.

According to one embodiment of the present invention, the traveling wave of electrical charge in selected phase relation to the applied traveling potential wave is induced along the surface of an interface established between the gas and liquid phases of the working fluid, and which extends along the return flow path.

According to another embodiment of the present invention, the traveling wave of electrical charge in selected phase relation to the applied traveling potential wave is induced in the liquid bulk of a working fluid consisting of two immiscible fluids, at the multiple interfaces that are established therebetween.

In both embodiments, a segmented electrode positioned along and spaced from the condensate return flow path may be used for applying the traveling potential wave.

Accordingly, it is an object of this invention to provide an EHD inductively pumped heat pipe especially suitable for use in low and medium temperature applications.

Another object of this invention to provide a heat pipe the maximum thermal throughput of which is not limited by a failure of a capillary pumping head or by the breakdown strength of a dielectric working fluid.

A related object of this invention is to provide a heat pipe that is self-priming.

Yet another related object is to provide a heat pipe the rate of heat transfer of which is voltage controllable.

Other objects, advantages and novel features will become apparent from the appended claims and the following detailed description and drawings, wherein like parts are similarly designated throughout, and wherein:

DESCRIPTION OF THE DRAWINGS

FIG. 8 is similar to FIG. 5 and is a graph showing an instantaneous view of applied voltage with distance;

FIG. 9 is a sectional view of an EHD inductively pumped heat pipe employing an interface between the gas and liquid phases of the working fluid; and FIG. 10 is a sectional view along the line 10—10 of FIG. 9.

DESCRIPTION OF THE PREFERRED EMBODIMENTS

Figure 1:
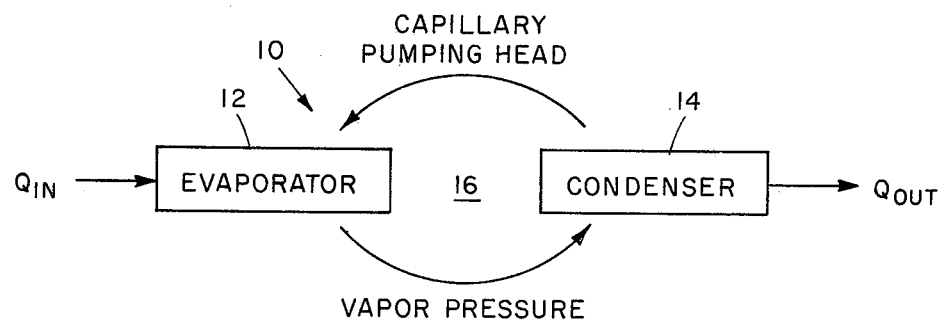
FIG. 1 is a diagram illustrating the principle of operation of a prior art heat pipe.

Referring now to FIG. 1, which shows a diagram illustrating the operation of a prior art heat exchanging heat pipe 10, heat ($Q_{in}$) is supplied to a hot evaporating section 12 and removed ($Q_{out}$) from a spatially remote cold condensing section 14 that is connected thereto.

The heat to be exchanged is supplied to and removed from a two-phase dielectric working fluid 16 at the heat transfer sections 12 and 14. At the evaporator 12, $Q_{in}$ causes the working fluid to evaporate into a gas, the pressure of which carries the latent heat of vaporization of the working fluid through a gas phase flow channel to the condensor 14. The condensing section 14 removes a quantity of heat ($Q_{out}$) as the working fluid condenses back into the liquid phase. A capillary pumping head returns the liquid phase working fluid through a liquid phase return circuit back to the evaporator and the cycle is repeated indefinitely. Typically, the capillary pumping head is established by a capillary wick material or longitudinal arterial structure. Within the heat transfer sections 12 and 14 of heat pipe 10, the liquid phase of the dielectric working fluid 16 is commonly distributed and transported by circumferential capillary wicks and grooves. U.S. Pat. No. 2,350,348, issued June 6, 1944 to Gaugler, incorporated herein by reference, exemplifies the capillary driven heat pipe.

Figure 2:
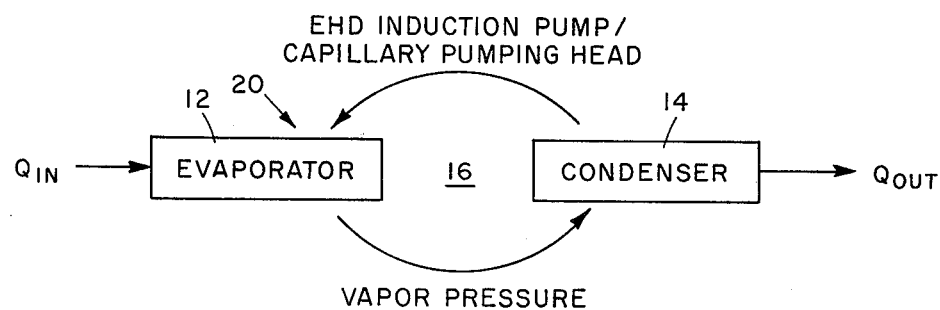
FIG. 2 is a diagram illustrating the principle of operation of the present invention.

Referring now to FIG. 2, a diagram is shown illustrating the operation of the electrohydrodynamic (EHD) inductively pumped heat pipe 20 of the present invention. The features of the EHD inductively pumped heat pipe 20 of the present invention are similar to prior art heat pipes except for an EHD induction pumping of the liquid phase of a dielectric working fluid 16 along the flow path along which the liquid phase of the working fluid is pumped from the condensor to the evaporator. The EHD induction pumping of the present invention may be used to aid or replace the conventional capillary pumping head of the prior art heat pipe 10. As will appear more fully below, the EHD induction pumping of the present invention involves an interaction between a traveling potential wave, applied along the liquid phase return flow circuit, and electrical charges induced by the applied wave in the liquid phase of the working fluid at interfaces of boundries where the conductivity gradient of the fluid undergoes a discontinuity. The charges induced within the liquid phase of the working fluid form a traveling wave of electrical charge selectively out of phase with the applied traveling wave resulting in a force on the liquid causing it to be pumped.

Figure 3:
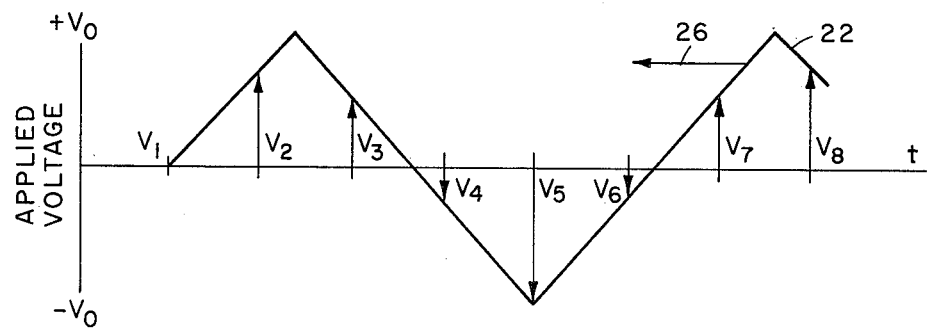
FIG. 3 is a graph showing an instantaneous view of a traveling potential wave.
Figure 4:
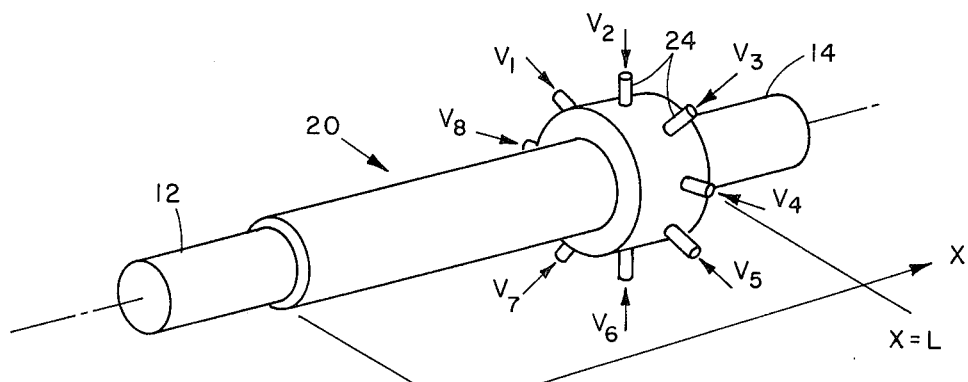
FIG. 4 is a perspective view of an EHD inductively pumped heat pipe showing a configuration of an external input electrode terminal structure.

Referring now to FIGS. 3 and 4, a traveling potential wave 22 having instantaneous voltages $V_1, V_2, \ldots V_8$ is applied to input terminals 24 of heat pipe 20 by phased generators or other suitable means, not shown. The potentials $V_1, V_2, \ldots V_8$, applied to each of the input electrodes 24, vary from a peak positive applitude $V_0$ to a peak negative amplitude $-V_0$ with a selected wave velocity illustrated at 26. It is to be noted that although a triangular traveling potential wave is shown, other suitable time varying waveforms such as a sinusoidy may also be applied.

Figure 5:
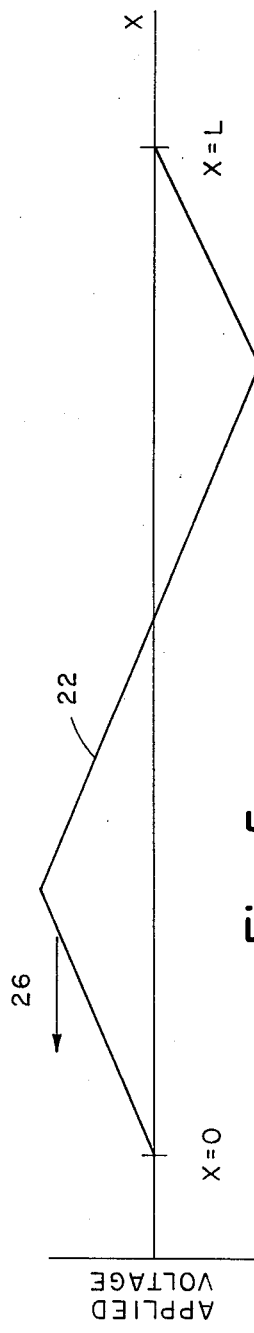
FIG. 5 is a graph showing an instantaneous view of applied voltage with distance.
Figure 6:
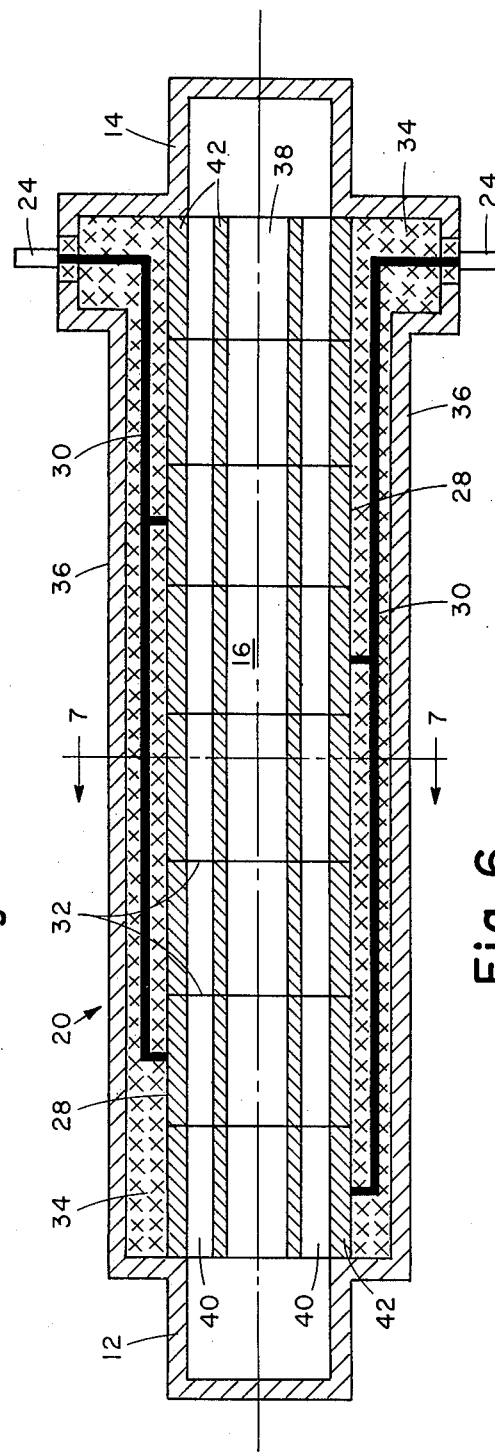
FIG. 6 is a sectional view of an EHD inductively pumped heat pipe employing immiscible working fluids.
Figure 7:
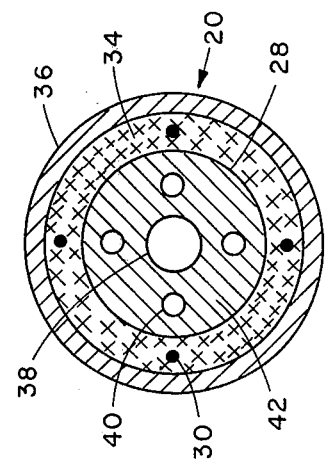
FIG. 7 is a sectional view along the line 7—7 of FIG. 6.

Referring now to FIGS. 5, 6 and 7, which show one embodiment of the EHD inductively pumped heat pipe 20 of the present invention, the potentials, $V_1, V_2, \ldots V_8$, applied to the input terminals 24 are coupled to electrode segments 28 by electrical bus conductors 30. The electrode segments are positioned circumferentially along the length of the heat pipe, and the potentials applied thereto give rise to a spatially distributed traveling potential wave propagating from X=L to X=0 with the wave velocity 26 as shown in FIG. 5. The field lines of the spatially distributed traveling potential wave, not shown, extend across the axis of heat pipe 20. Insulation 32 is provided to electrically isolate the segments 28 from each other and insulation 34 is provided to electrically isolate the bus conductors 30 from the electrode segments 28 and from shell 36 of heat pipe 20.

A gas phase flow tube 38 is coaxially positioned within heat pipe 20 and provides a channel connecting the evaporator 12 to the condensor 14 which guides the flow of the gas phase of working fluid 16. Liquid phase flow tubes 40 are disposed within support 42 intermediate the segmented electrodes 28 and the gas phase flow tube 38 and provide channels for guiding the return flow of the liquid phase of the working fluid from the condensor to the evaporator. Working fluid 16 consists of two immiscible dielectric fluids for providing a discontinuity in the conductivity gradient of the dielectric working fluid at the multiple interfaces which exist between the immiscible fluids.

The embodiment as shown in FIGS. 8, 9 and 10 uses a homogeneous dielectric working fluid 16' and provides a discontinuity in the conductivity gradient of the working fluid along an open interface. This interface is established between the gas phase flow tube 38 and liquid phase flow channels 44, and extends along the flow path along which the working fluid is pumped.

In operation, the applied traveling potential wave induces electrical charge in the liquid phase of the working fluid. These charges relax to the interface where the conductivity gradient undergoes a discontinuity and form a traveling wave of electrical charge in selected phase lag with the applied traveling potential wave. The result is a time average electrical traction tending to pump the liquid phase of the dielectric working fluid from the condensing to the evaporating sections. The article entitled "Traveling-Wave Induced Electroconvection" by Melcher, appearing at Vol. 9, No. 8, Physics Fluids, pp. 1548-1555 (1966), explains and relates this phenomena in the context of flow in a re-entrant channel, and is incorporated herein by reference.

In the embodiment of FIGS. 5, 6 and 7, the electrical traction is produced in the liquid bulk of the liquid phase of the dielectric working fluid at the multiple interfaces of the immiscible working fluids. In the embodiment of FIGS. 8, 9 and 10, the electrical traction is produced along the surface of the open interface established between the liquid and gas phase of the homogeneous dielectric working fluid. In both embodiments, the EHD inductively pumped heat pipe of the present invention is self-priming and has a heat transfer rate that is voltage controllable.

It is to be noted that many variations of the presently disclosed invention are possible. For example, a continuous transmission electrode may be used for applying the traveling potential wave. In addition, sharpened electrodes and ionizing radiation may be used to inject or produce electrical charge in the liquid phase of the working fluid. It is to be understood that although eight evenly spaced electrodes are shown, a different number of electrodes of non-uniform spacing may be used.

In summary, the self-priming voltage controllable electrohydrodynamic inductively pumped heat pipe of the present invention greatly improves the maximum thermal throughput of heat pipes in low and medium temperature applications calling for the use of dielectric working fluids. An applied traveling potential wave induces a traveling wave of electrical charge in selected phase relation in the liquid phase of the dielectric working fluid providing an electrical traction which pumps the working fluid from the condensor to the evaporator.

What is claimed:

1. An induction pump for pumping a dielectric liquid along a flow path from a condensing section toward an evaporating section of a heat pipe, comprising:
   means for applying a traveling potential wave along said flow path along which said liquid is pumped from said condensing section to said evaporating section; and
   means for inducing a traveling wave of electrical charge in said liquid in selected phase relation to said applied traveling potential wave for pumping said liquid.

2. An induction pump for pumping a dielectric liquid along a flow path from a condensing section toward an evaporating section of a heat pipe, as recited in claim 1, wherein:
   said evaporating section evaporates said liquid forming a gas; and
   said inducing means comprising an interface between said gas and said liquid along said flow path along which said liquid is pumped.

3. An induction pump for pumping a dielectric liquid along a flow path from a condensing section toward an evaporating section of a heat pipe, as recited in claim 1, wherein:
   said inducing means comprises a liquid consisting of two immiscible dielectric fluids.

4. An induction pump for pumping a dielectric liquid along a flow path from a condensing section toward an evaporating section of a heat pipe, as recited in claims 2 or 3, wherein:
   said applying means comprises a segmented electrode positioned along and spaced from said flow path along which said liquid is pumped.

5. A method for pumping a liquid condensate along a flow path from a condensor toward an evaporator in a heat pipe, comprising the steps of:
   applying a traveling potential wave along said flow path along which said liquid condensate is pumped; and
   inducing a traveling wave of electrical charge in said liquid condensate in selected phase relation to said applied traveling potential wave for pumping said liquid condensate.

6. A method for pumping a liquid condensate along a flow path from a condensor toward an evaporator in a heat pipe, as recited in claim 5, wherein:
   said liquid condensate has a conductivity gradient; and
   further comprising the step of producing a discontinuity in said conductivity gradient of said liquid condensate.

7. A method for pumping a liquid condensate along a flow path from a condensor toward an evaporator in a heat pipe, as recited in claim 6, wherein:
   said evaporator evaporates said liquid condensate to a gas, and wherein said discontinuity is produced by providing an interface between said gas and said liquid condensate along said flow path along which said liquid condensate is pumped.

8. A method for pumping a liquid condensate along a flow path from a condensor toward an evaporator in a heat pipe, as recited in claim 6, wherein:
   said discontinuity is produced by employing a liquid condensate consisting of two immiscible fluids.

9. A self-priming voltage controllable EHD inductively pumped heat pipe, comprising:
   a condensing section;
   an evaporating section;
   a tube connecting said condensing and evaporating sections;
   a plurality of electrode segments circumferentially disposed around and positioned along said tube;
   a working fluid having a liquid and gas phase;
   a first conduit disposed within said tube for guiding said working fluid in said gas phase from said evaporating section to said condensing section;
   a second conduit disposed within said tube for guiding said working fluid in said liquid phase from said condensing section to said evaporating section; and
   electrical means for generating a traveling wave of electric potential and inducing a corresponding traveling wave of electric charge in said liquid for pumping thereof from said condensing section to said evaporating section of said heat pipe.

10. A self-priming voltage controllable EHD inductively pumped heat pipe as recited in claim 9, wherein said working fluid is a homogeneous dielectric working fluid, and further comprising said first and second conduits having an open interface extending along the length of said tube.

11. A self-priming voltage controllable EHD inductively pumped heat pipe as recited in claim 9, wherein said working fluid consists of two immiscible dielectric working fluids.

* * * * *